(No Model.)

A. J. O'NEAL.
FLOWER HOLDER.

No. 568,269. Patented Sept. 22, 1896.

Witnesses:
Sidney P. Hollingsworth
Arthur Garner

Inventor:
Adelaide Johnson O'Neal,
by W. T. Howard,
Attys.

THE NORRIS PETERS CO., PHOTO-LITHO., WASHINGTON, D. C.

UNITED STATES PATENT OFFICE.

ADELAIDE JOHNSON O'NEAL, OF SAN FRANCISCO, CALIFORNIA.

FLOWER-HOLDER.

SPECIFICATION forming part of Letters Patent No. 568,269, dated September 22, 1896.

Application filed April 22, 1896. Serial No. 588,640. (No model.)

*To all whom it may concern:*

Be it known that I, ADELAIDE JOHNSON O'NEAL, a citizen of the United States, residing at San Francisco, in the county of San Francisco and State of California, have invented certain new and useful Improvements in Flower-Holders, of which the following is a specification, reference being had to the accompanying drawings and the letters marked thereon.

My invention relates to a device adapted to be attached to the dress of a person for the convenient holding of flowers, the object being to provide a cheap, simple, and unobtrusive holder that shall firmly clasp the stems of the flowers when placed therein and maintain them in the position desired without the danger of their becoming detached.

Figure 1:
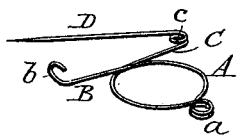
Figure 2:
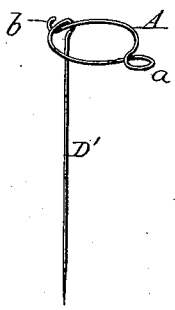

In the drawings, Figure 1 is a perspective view of my invention in one of its forms, and Fig. 2 is a similar view showing a modification in the mode of attachment to the dress.

Similar letters of reference indicate similar parts in the respective figures.

Referring to Fig. 1, A is a spring-loop of wire or other suitable material, within which the flowers are placed, and which has a small coil $a$, of one or more turns, formed therein. The coil $a$ may be omitted, if desired, or a spring-hinge substituted therefor. B C are continuations of the wire forming the spring-loop, which, after crossing, extend in a straight line in opposite directions. The portion B of the wire projects a short distance beyond the loop A, where it is formed into a U-shaped hook $b$. The part C, extending in the opposite direction, projects about the same distance, where the wire is wound into a coil $c$ and turns upon itself backward in the direction of the hook $b$, ending in a sharp point a short distance beyond said hook, so as to produce the pin D.

Instead of forming the coil $c$ integrally with the pin D, I may hinge the pin to the portion C in any well-known manner.

When it is desired to use this device, the hook $b$ and coil $c$ are grasped by the hands and pressed slightly together, thus opening the spring-loop A sufficiently to allow the stems of the flowers to be placed therein. On removing the pressure the loop will react and firmly clasp the flowers. The pin D is then passed through the dress and secured in the hook $b$.

In Fig. 2, instead of extending the wire laterally to form the straight portions B C, I turn one end of the wire downward, after forming one side of the coil A, and point it to form a pin D', the other end, after crossing the first, extending a short distance beyond the pin, where it is bent to form a hook $b'$. By drawing the hook and pin together the spring-loop A will be opened for the insertion of the flowers.

This flower-holder may be made of gold, silver, aluminium, or other suitable metal, in the form of a flat strip, or of wire, either round or square. I prefer fine, stiff spring-wire, as it will give the best results and be almost invisible. The loop A may be made of various sizes to hold boutonniéres or bouquets, whether large or small.

What I claim is—

A flower-holder formed of a single length of spring-wire, the same being bent into a loop A for holding the flowers, and having a coil $a$ integral with said loop, the wire crossing as shown, one end being continued in one direction from said crossing-point and the other in an opposite direction, one end being formed in a pin and the other into a hook to engage said pin, substantially as set forth.

In testimony whereof I hereunto set my hand and seal this 1st day of April, 1896.

ADELAIDE JOHNSON O'NEAL. [L. S.]

Witnesses:
ALBERT M. JOHNSON,
H. C. BOLLENBACHER.